United States Patent
Lee et al.

(10) Patent No.: US 9,386,300 B2
(45) Date of Patent: Jul. 5, 2016

(54) PORTABLE DEVICE AND METHOD FOR CONTROLLING THE SAME

(71) Applicant: LG ELECTRONICS INC., Seoul (KR)

(72) Inventors: Doyoung Lee, Seoul (KR); Sinae Chun, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 80 days.

(21) Appl. No.: 14/524,336

(22) Filed: Oct. 27, 2014

(65) Prior Publication Data
US 2016/0050408 A1 Feb. 18, 2016

(30) Foreign Application Priority Data
Aug. 18, 2014 (KR) ........................ 10-2014-0106781

(51) Int. Cl.
| | |
|---|---|
| H04N 5/222 | (2006.01) |
| H04N 15/00 | (2006.01) |
| G09G 5/00 | (2006.01) |
| H04N 13/02 | (2006.01) |
| H04N 5/247 | (2006.01) |
| H04N 5/232 | (2006.01) |

(52) U.S. Cl.
CPC ....... *H04N 13/0282* (2013.01); *H04N 5/23238* (2013.01); *H04N 5/247* (2013.01); *H04N 2213/001* (2013.01)

(58) Field of Classification Search
CPC ... G06F 1/1616; G06F 1/1641; G06F 1/1649; G06F 1/1677; G06F 2200/1637; G06F 3/147; G09G 2340/0492; G09G 2360/04; G09G 2360/06; G06T 13/80; H04M 1/0247; H04M 2250/16; H04M 1/022; H04M 2250/12
See application file for complete search history.

(56) References Cited

U.S. PATENT DOCUMENTS

| 6,643,124 | B1 * | 11/2003 | Wilk ..................... G06F 1/1616 312/223.1 |
|---|---|---|---|
| 8,803,816 | B2 | 8/2014 | Kilpatrick, II et al. |
| 2009/0275366 | A1 * | 11/2009 | Schilling ............... G06F 1/1615 455/566 |
| 2009/0278974 | A1 * | 11/2009 | Kuwahara .............. G03B 29/00 348/333.06 |
| 2010/0064244 | A1 | 3/2010 | Kilpatrick, II et al. |
| 2010/0201604 | A1 | 8/2010 | Kee et al. |
| 2012/0235894 | A1 * | 9/2012 | Phillips .................... G09G 3/36 345/156 |
| 2015/0185787 | A1 * | 7/2015 | Choi ...................... G06F 1/1677 345/156 |

FOREIGN PATENT DOCUMENTS

| JP | 2012-37599 A | 2/2012 |
|---|---|---|
| KR | 10-2007-0077654 A | 7/2007 |
| KR | 10-0803504 B1 | 2/2008 |
| KR | 10-2010-0092222 A | 8/2010 |

* cited by examiner

*Primary Examiner* — Trung Diep
(74) *Attorney, Agent, or Firm* — Birch, Stewart, Kolasch & Birch, LLP

(57) ABSTRACT

A method for controlling the portable device may include detecting that the second body or the third body is folded to the first body and capturing an image by at least one of a first camera unit located in the second body and a second camera unit located in the third body. In this case, the first camera unit may capture an image of a first direction, and the second camera unit may capture an image of a second direction. In this case, the image may be captured based on a first capturing mode when the portable device is in an unfolded state, the image may be captured based on a second capturing mode when the portable device is in a first folded state, and the image may be captured based on a third capturing mode when the portable device is in a second folded state.

20 Claims, 19 Drawing Sheets

Front

Rear first capturing mode first capturing mode

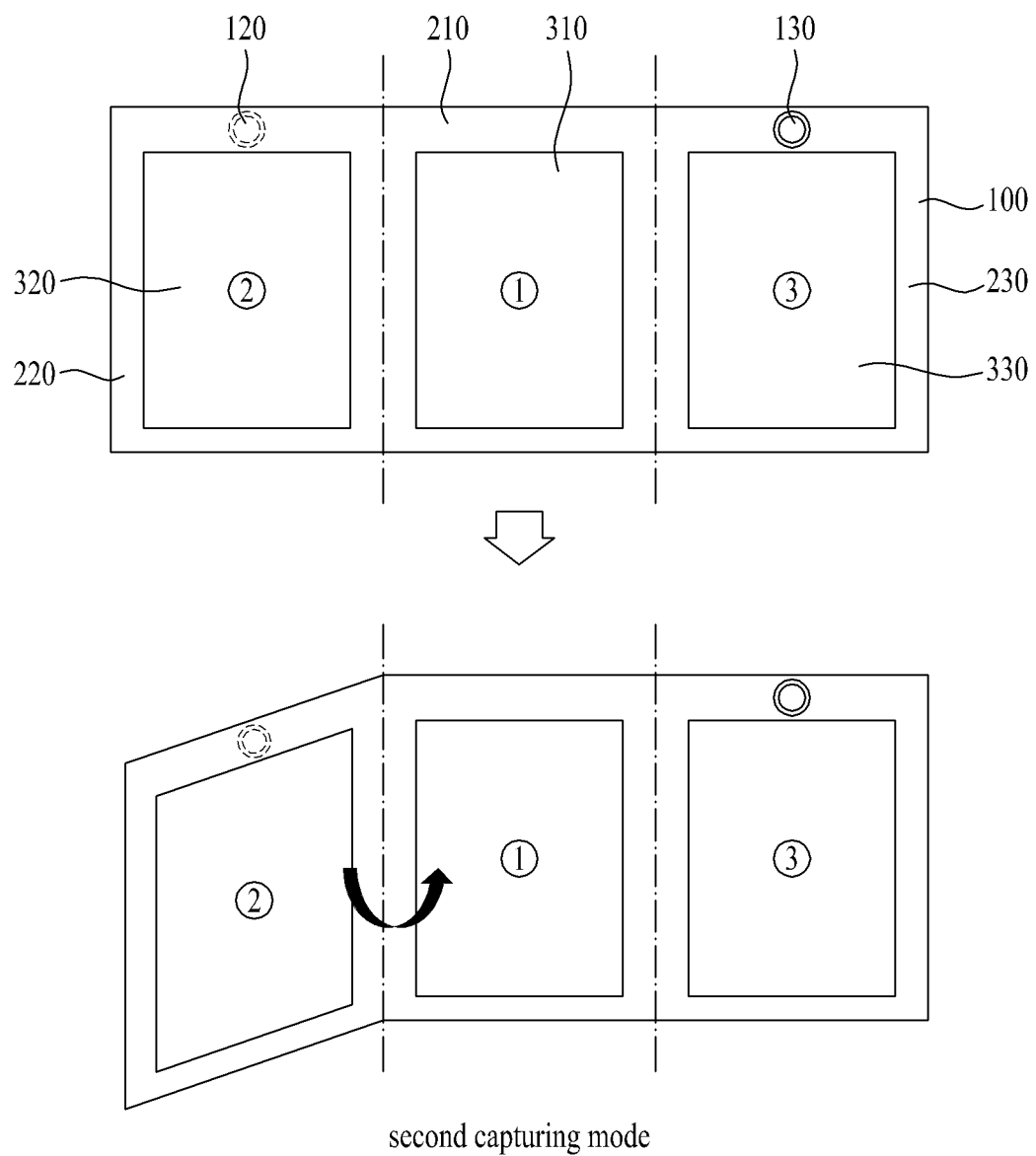

Front

Rear second capturing mode first capturing mode

Front

Rear second capturing mode panorama image 3D image third capturing mode

Front

Rear

PORTABLE DEVICE AND METHOD FOR CONTROLLING THE SAME

Pursuant to 35 U.S.C. §119(a), this application claims the benefit of the Korean Patent Application No. 10-2014-0106781, filed on Aug. 18, 2014, which is hereby incorporated by reference as if fully set forth herein.

BACKGROUND OF THE INVENTION

1. Field of the Invention

The present specification relates to a portable device and a method for controlling the same.

2. Discussion of the Related Art

A portable device may be manufactured in a foldable structure. Conventionally, the portable device, which includes two bodies, had been manufactured in such a manner that the two bodies could mutually be folded by folding. In this respect, the portable device has been recently manufactured to include three bodies in such a manner that the three bodies that may be folded by folding. At this time, the portable device may include a plurality of camera units. The portable device requires a method for controlling the plurality of camera units in accordance with a folded structure.

SUMMARY OF THE INVENTION

Accordingly, the present specification is directed to a portable device and a method for controlling the same, which substantially obviate one or more problems due to limitations and disadvantages of the related art.

An object of the present specification is to provide a portable device that includes a first body at a center, a second body located at a left side of the first body, and a third body located at a right side of the first body.

Another object of the present specification is to provide a method for allowing a portable device to capture an image by using a first camera unit included in a second body and a second camera unit included in a third body.

Still another object of the present specification is to provide a method for setting an image capturing mode of a portable device differently in accordance with a folding state of a first body, a second body and a third body.

Further still another object of the present specification is to provide a method for allowing a portable device to display a preview image corresponding to a captured image.

Further still another object of the present specification is to provide a method for synthesizing captured images by using a first camera unit and a second camera unit of a portable device.

Further still another object of the present specification is to provide a method for generating a panorama image by using a first camera unit and a second camera unit of a portable device.

Further still another object of the present specification is to provide a method for generating a 3D image by using a first camera unit and a second camera unit of a portable device.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a portable device according to one embodiment of the present specification may include a first body at a center, a second body located at a left side of the first body, and a third body located at a right side of the first body. Also, the portable device may include a display unit configured to display an image on at least one of a first region of the first body, a second region of the second body and a third region of the third body. Also, the portable device may include a first camera unit included in the second body and configured to capture an image of a first direction, and a second camera unit included in the third body and configured to capture an image of a second direction. Also, the portable device may include a sensor unit configured to detect that the second body or the third body is folded to the first body. Also, the portable device may include a processor configured to control the display unit, the first camera unit, the second camera unit and the sensor unit. In this case, the processor may capture the image based on a first capturing mode when the portable device is in an unfolded state, capture the image based on a second capturing mode when the portable device is in a first folded state and capture the image based on a third capturing mode when the portable device is in a second folded state.

In another aspect of the present specification, a method for controlling a portable device may include the steps of detecting that a second body or a third body is folded to a first body, by using a sensor unit; and capturing an image by at least one of a first camera unit included in the second body and a second camera unit included in the third body. In this case, the first camera unit may capture an image of a first direction, and the second camera unit may capture an image of a second direction. In this case, the image may be captured based on a first capturing mode when the portable device is in an unfolded state, the image may be captured based on a second capturing mode when the portable device is in a first folded state, and the image may be captured based on a third capturing mode when the portable device is in a second folded state.

According to the present specification, the portable device and the method for controlling the same may be provided.

Also, according to the present specification, the portable device, which includes a first body at a center, a second body located at a left side of the first body, and a third body located at a right side of the first body, may be provided.

Also, the portable device may capture an image by using a first camera unit included in a second body and a second camera unit, which are included in a third body.

Also, the portable device may set an image capturing mode differently in accordance with a folding state of the first body, the second body and the third body.

Also, the portable device may display a preview image corresponding to a captured image.

Also, the portable device may synthesize captured images by using the first camera unit and the second camera unit.

Also, the portable device may generate a panorama image by using the first camera unit and the second camera unit.

Also, the portable device may generate a 3D image by using the first camera unit and the second camera unit.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIGS. 5a and 5b are diagrams illustrating a method for setting a portable device in a second capturing mode in accordance with one embodiment of the present specification;

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

Although the embodiments of the present specification will be described in detail with reference to the accompanying drawings and the disclosure described by the drawings, it is to be understood that claims are not limited by such embodiments.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Although the terms such as "first" and/or "second" in this specification may be used to describe various elements, it is to be understood that the elements are not limited by such terms. The terms may be used to identify one element from another element. For example, a first element may be referred to as a second element or vice versa within the range that departs from the scope according to a concept of the present specification.

Also, in the specification, when a module "includes" an element, it means that the module may further include another element unless otherwise specified. The suffixes " . . . unit" and " . . . module" for the elements used in the specification are given or used to mean a unit for processing at least one function or operation, and may be implemented by combination of hardware and/or software.

Figure 1:
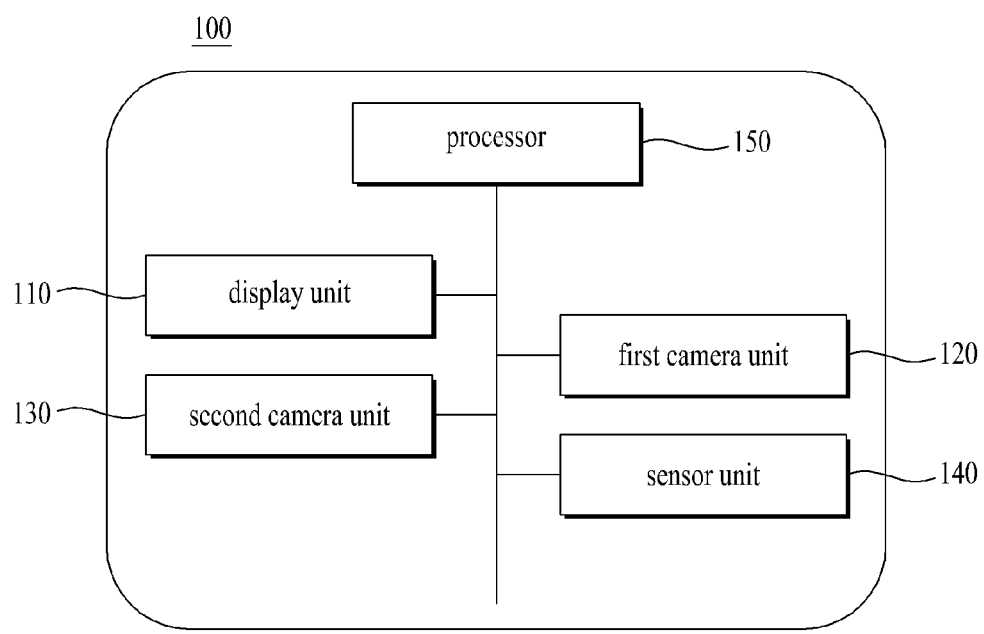
FIG. 1 is a block diagram illustrating a portable device according to one embodiment of the present specification.

FIG. 1 is a block diagram illustrating a portable device according to one embodiment of the present specification.

The portable device 100 may be a device that includes a first body, a second body, and a third body. In more detail, the portable device may be a device that includes a first body at the center, a second body located at a left side of the first body, and a third body located at a right side of the first body. For example, the portable device may be a device folded based on the first body of the center. The second body located at the left side of the first body may be folded to the first body. Also, the third body located at the right side of the first body may be folded to the first body. In other words, the portable device 100 may have a device structure that includes three bodes that may be folded. Also, for example, the portable device may be a flexible device. For example, the aforementioned first body, the second body, and the third body may be one unified structure. At this time, the portable device has a flexible structure and may identify the first body, the second body and the third body from one another based on folding or unfolding. In more detail, the flexible device is made of a flexible material and may be folded. At this time, for example, if the flexible device is folded twice based on two folding lines, the flexible device may be divided into three regions. The three regions may respectively correspond to the first body, the second body and the third body. In other words, the foldable device 100 may have a structure that it may be divided into three regions based on two folding lines, and is not limited to the aforementioned embodiment.

The portable device 100 may include a display unit 110, a first camera unit 120, a second camera unit 130, a sensor unit 140, and a processor 150. At this time, for example, each unit may be a component or part, which constitutes the portable device 100. In other words, each unit may be one independent unit housed in the portable device 100 to allow the portable device 100 to implement its function, and is not limited to the aforementioned embodiment.

The display unit 110 may be controlled by the processor 150. At this time, the display unit 110 may display an image on at least one of the first region of the first body, the second region of the second body, and the third region of the third body. For example, the first body may include a first display unit, and may display an image on the first region by using the first display unit. Also, the second body may include a second display unit, and may display an image on the second region by using the second display unit. Also, the third body may include a third display unit, and may display an image on the third region by using the third display unit. In other words, the display unit may separately be included in each body and display an image on the region included in each body. Also, for example, the display unit 110 is one unified unit, and may display an image on each of the first region, the second region and the third region. For example, if the portable device 100 is a flexible display device, the display unit 110 may have one unified structure. At this time, the display unit 110 may display each image on each of the first region, the second region and the third region based on folding of the flexible display device. In other words, the display unit 110 may be a unit that may display an image on the first region of the first body, the second region of the second body and the third region of the third body, and is not limited to the aforementioned embodiment.

Also, for example, the display unit 110 may display an image in front regions and rear regions of the first body, the second body and the third body. In more detail, the first region may be set on the front surface or rear surface of the first body. Also, the first region may be set to both front and rear surfaces of the first body. In other words, the portable device 100 may display an image on any one of the front surface and the rear surface of each body, and is not limited to the aforementioned embodiment.

The portable device 100 may include a first camera unit 120. Also, the portable device 100 may include a second camera unit 130. At this time, the camera units 120 and 130 may sense and capture an image. In more detail, the camera units 120 and 130 may take a peripheral environment of the portable device 100 as an image and convert the taken image to an electrical signal. To this end, the camera units 120 and 130 may include an image sensor. The image sensor may convert an optical signal into an electrical signal. The image taken by the camera units 120 and 130 and converted to the electrical signal may be stored in a storage unit (not shown). Also, the processor 150 may generate a panorama image, a 3D image and a synthetic image by using the image taken by the camera units 120 and 130. In other words, the processor 150 may generate different images by using each image taken by the plurality of camera units 120 and 130. This will be described later.

The first camera unit 120 is included in the second body, and may take an image. Also, the second camera unit 130 is included in the third body, and may take an image. At this time, for example, the first camera unit 120 may be included in the second body to take a front direction of the second body as an image. Also, the second camera unit 130 may be included in the third body to take a rear direction of the third body as an image. In other words, the first camera unit 120 and the second camera unit 130 may be included in each body to take images of different directions. Also, for example, the first camera unit 120 may be included to take a rear direction of the second body as an image. The second camera unit 130 may be included to take a front direction of the third body as an image, and is not limited to the aforementioned embodiment.

The portable device 100 may include a sensor unit 140. At this time, the sensor unit 140 may detect that the second body is folded to the first body. Also, the sensor unit 140 may detect that the third body is folded to the first body. In more detail, the second body may be folded to the first body as described above. Also, the third body may be folded to the first body. At this time, the sensor unit 140 may detect that at least one of the second body and the third body is folded, and may forward the detected information to the processor 150. As a result, the processor 150 may detect a folding state of the portable device 100. For example, the sensor unit 140 may further detect a first folding angle of the first body and the second body. Also, the sensor unit 140 may further detect a second folding angle of the first body and the third body. At this time, the first folding angle and the second folding angle may be the greatest at an unfolded state. The unfolded state may be the state that the second body and the third body are unfolded. In other words, the unfolded state may be the state that the first body, the second body and the third body constitute the same plane. At this time, the sensor unit 140 may detect folding or unfolding of the second body based on the first folding angle. In more detail, if the first folding angle becomes less than a threshold angle, the sensor unit 140 may detect that the second body is folded to the first body. Also, the sensor unit 140 may detect folding or unfolding of the third body based on the second folding angle. In more detail, if the second folding angle becomes less than the threshold angle, the sensor unit 140 may detect that the third body is folded to the first body. At this time, the threshold angle may be an angle for determining that each body has been folded, and may have a certain error range. In other words, if the folding angle of each body becomes less than a predetermined threshold angle, the sensor unit 140 may detect folding or unfolding of the corresponding body and forward the detected folding information to the processor 150.

The processor 150 may be a unit that controls at least one of the display unit 110, the first camera unit 120, the second camera unit 130 and the sensor unit 140. In more detail, the processor 150 may receive folding information of the second body and the third body from the sensor unit 140. At this time, if the second body and the third body are unfolded, the processor 150 may execute the first capturing mode. At this time, the first capturing mode may be mode for taking a peripheral image by using at least one of the first camera unit 120 of the second body and the second camera unit 130 of the third body. This will be described later with reference to FIG. 3 and FIGS. 4*a* and 4*b*.

Also, in case of a first folded state that any one of the second body and the third body is only folded, the processor 150 may execute the second capturing mode. In other words, the first folded state may be the state that one body is folded to the first body and the other body is unfolded. If the second capturing mode is executed, the processor 150 may take a peripheral image by using both the first camera unit 120 and the second camera unit 130. This will be described later with reference to FIGS. 5*a* and 5*b*, FIGS. 6*a* and 6*b*, FIGS. 7*a* and 7*b* and FIGS. 8*a* and 8*b*.

Also, in case of a second folded state that the second body and the third body are folded, the processor 150 may execute the third capturing mode. In other words, the second folded state may be the state that two bodies are all folded to the first body. If the third capturing mode is executed, the processor 150 may take a peripheral image by using at least one of the first camera unit 120 and the second camera unit 130. This will be described later with reference to FIGS. 9*a* and 9*b* and FIGS. 10*a* and 10*b*. Also, the processor 150 may display a preview image by using the display unit 110 in each capturing mode. In other words, the processor 150 may be a unit that controls each unit, and is not limited to the aforementioned embodiment.

Also, the aforementioned elements may be included in the portable device 100 as separate elements, or may be included in the portable device 100 by being incorporated into at least one element.

Figure 2A:
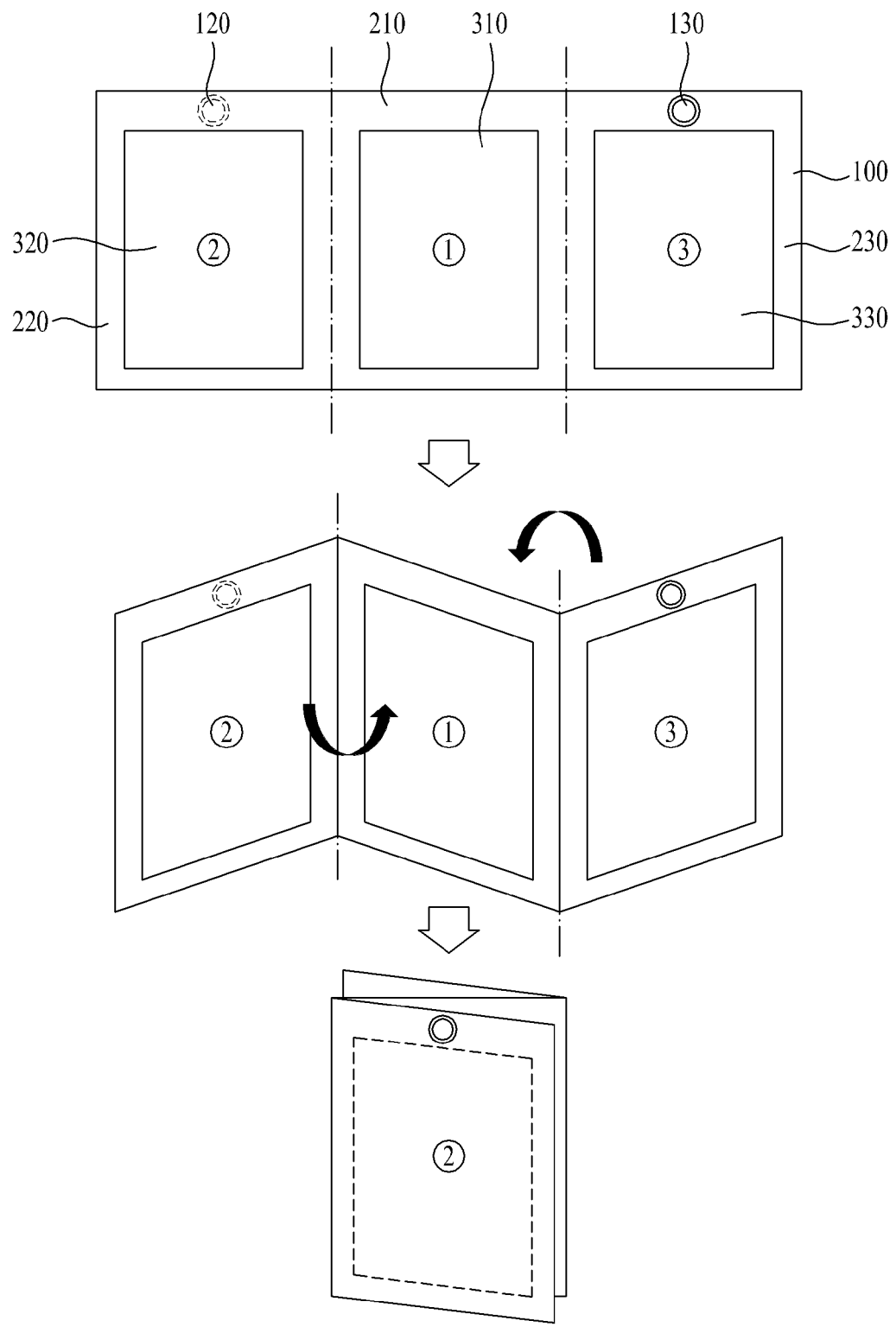
FIGS. 2a and 2b are diagrams illustrating a method for folding a portable device in accordance with one embodiment of the present specification.
Figure 2B:
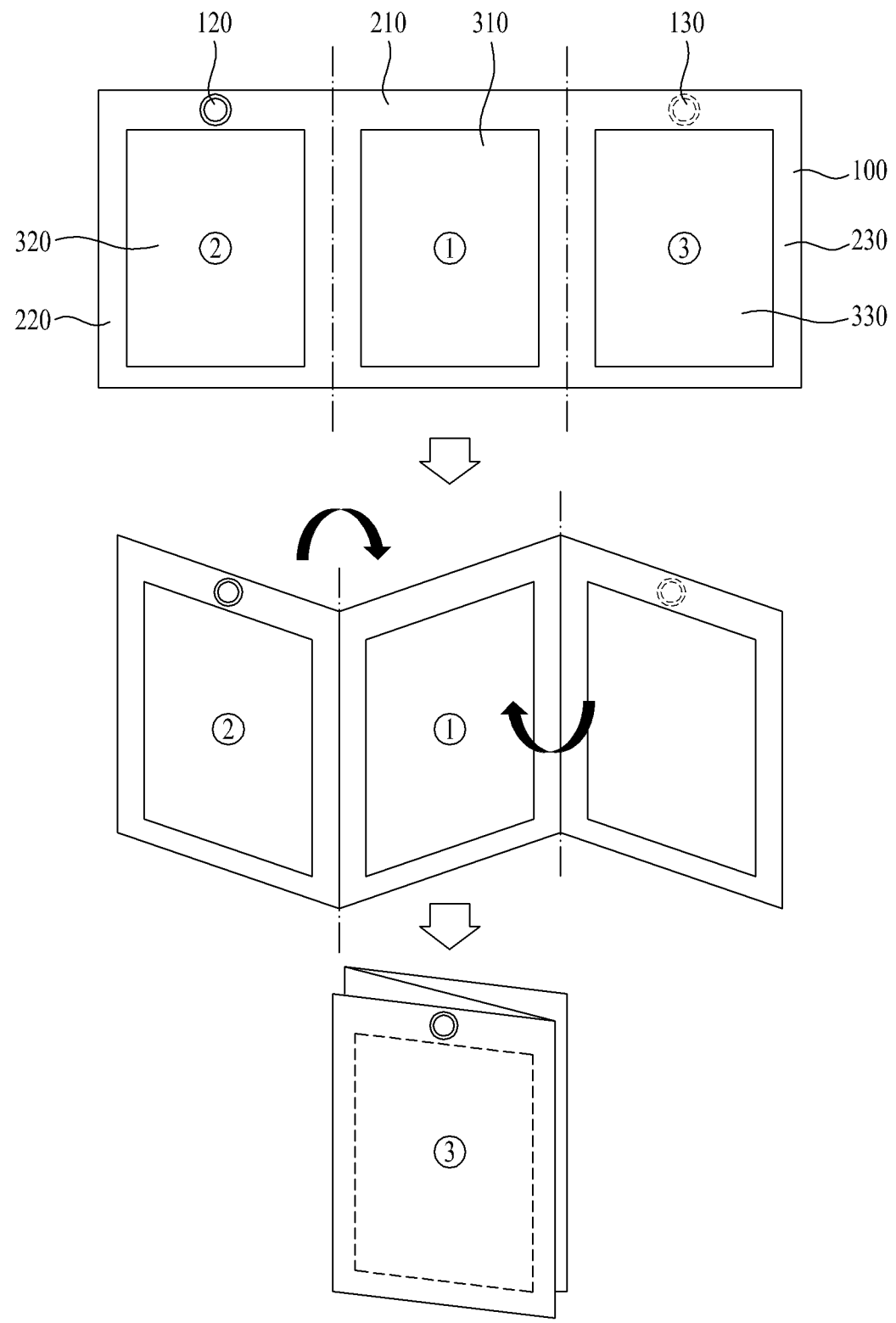

FIGS. 2*a* and 2*b* are diagrams illustrating a method for folding a portable device in accordance with one embodiment of the present specification. As described above, the portable device 100 may include a first body 210, a second body 220, and a third body 230. At this time, the second body 220 may be located at a left side of the first body 210. Also, the third body 230 may be located at a right side of the first body 210. The second body 220 may include a first camera unit 120. At this time, the first camera unit 120 may capture an image of a first direction. Also, the third body 230 may include a second camera unit 130. At this time, the second camera unit 130 may capture an image of a second direction.

For example, referring to FIG. 2a, the first camera unit 120 may be included to capture an image of a rear direction of the second body 220. In other words, the first direction may be the rear direction of the second body 220. Also, the second camera unit 130 may be included to capture an image of a front direction of the third body 230. In other words, the second direction may be the front direction of the third body 230. At this time, for example, the front direction may be the direction in which an image is displayed, in the portable device 100. Also, the rear direction may be the direction in which an image is not displayed in the portable device 100. In other words, if a user grips the portable device 100, the front direction may be the direction oriented towards the user, and the rear direction may be a reverse direction of the direction oriented towards the user. At this time, for example, if the first direction is the rear direction of the second body 220 and the second direction is the front direction of the third body 230, the second body 220 may be folded to the first body 210 such that the front surface of the second body 220 may be overlapped with the front surface of the first body 210. Also, the third body 230 may be folded to the first body 210 such that the rear surface of the third body 230 may be overlapped with the rear surface of the first body 210. In other words, the second body 220 and the third body 230 may be folded to respectively adjoin different surfaces of the first body 210.

Also, for example, referring to FIG. 2b, the first camera unit 120 may be included to capture an image of a front direction of the second body 220. In other words, the first direction may be the front direction of the second body 220. Also, the second camera unit 130 may be included to capture an image of a rear direction of the third body 230. In other words, the second direction may be the rear direction of the second body 220. At this time, for example, if the first direction is the front direction of the second body 220 and the second direction is the rear direction of the third body 230, the second body 220 may be folded to the first body 210 such that the rear surface of the second body 220 may be overlapped with the rear surface of the first body 210. Also, the third body 230 may be folded to the first body 210 such that the front surface of the third body 230 may be overlapped with the front surface of the first body 210. In other words, the second body 220 and the third body 230 may be folded to respectively adjoin different surfaces of the first body 210.

In other words, referring to FIGS. 2a and 2b, the portable device 100 may set a folding direction based on a direction in which the first camera unit 120 and the second camera unit 130 capture images. Hereinafter, each embodiment will be described based on FIG. 2a, and a method applied to each embodiment may equally be applied to the configuration shown in FIG. 2b.

Figure 3:
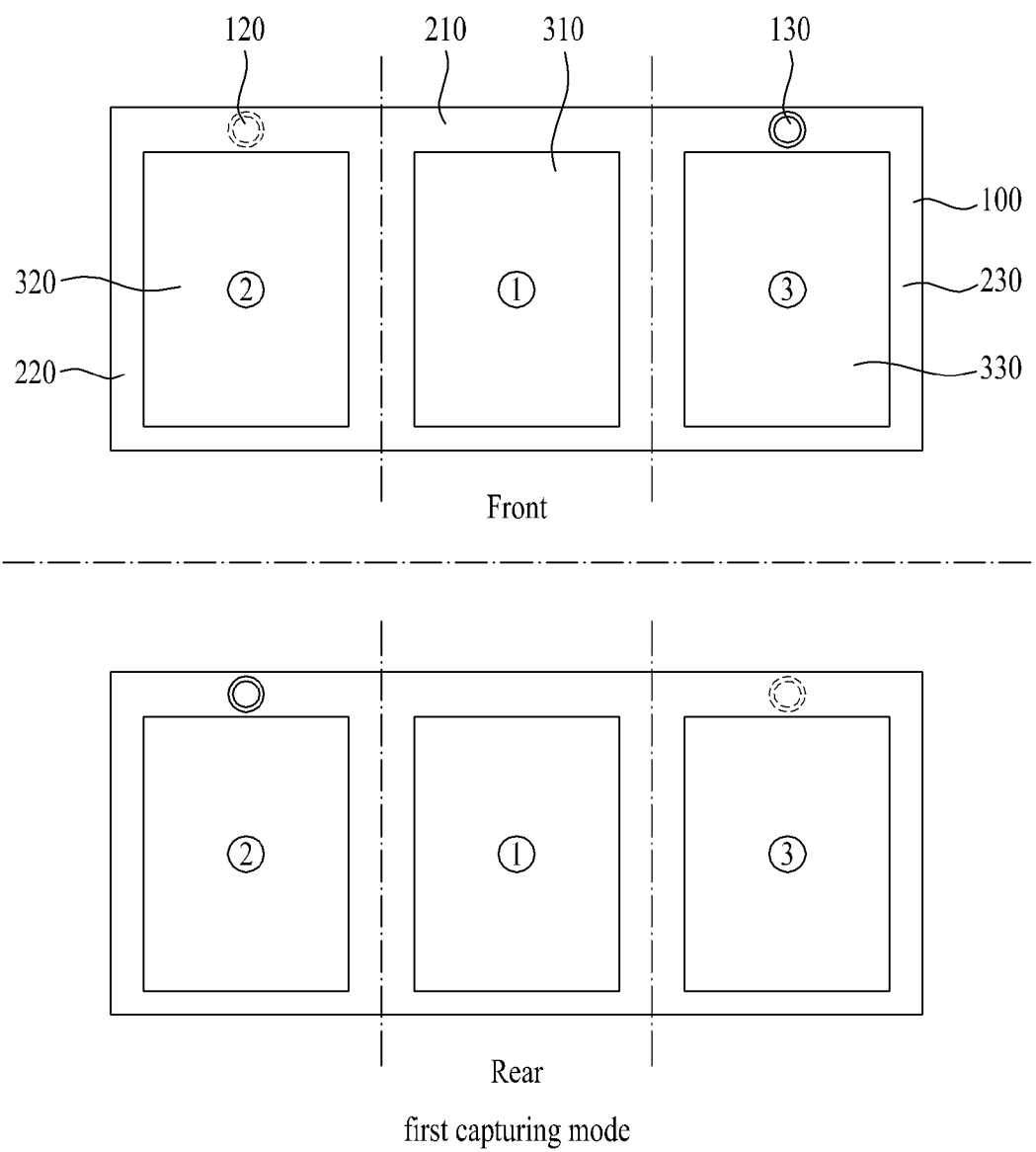
FIG. 3 is a diagram illustrating a method for setting a portable device in a first capturing mode in accordance with one embodiment of the present specification.

FIG. 3 is a diagram illustrating a method for setting a portable device in a first capturing mode in accordance with one embodiment of the present specification. If the second body 220 and the third body 230 are unfolded, the portable device 100 may set the first capturing mode. At this time, as described above, the sensor unit 140 may detect whether the second body 220 and the third body 230 have been folded. For example, the sensor unit 140 may detect the first folding angle which is a folding angle of the first body 210 and the second body 220. Also, the sensor unit 140 may detect the second folding angle which is a folding angle of the first body 210 and the third body 230. At this time, if the first folding angle is more than the threshold angle, the sensor unit 140 may detect that the second body 220 is unfolded. Also, if the second folding angle is more than the threshold angle, the sensor unit 140 may detect that the third body 230 is unfolded. At this time, the threshold angle may be changed by the user or the processor 150, and is as above. If the first capturing mode is set, the portable device 100 may take a peripheral image by using at least one of the first camera unit 120 and the second camera unit 130. At this time, for example, if the first capturing mode is set, the portable device 100 may capture the image in its rear direction by using the first camera unit 120. Also, if the first capturing mode is set, the portable device 100 may capture the image in its front direction by using the second camera unit 130. As a result, the portable device 100 may capture the image in its front direction or rear direction. At this time, for example, the portable device 100 may display a preview image of the captured image by using the display unit 110. As described above, the display unit 110 may display the image on at least one of the first region 310 of the first body, the second region 320 of the second body, and the third region 330 of the third body. If the portable device 100 displays the preview image, the portable device 100 may display the preview image on at least one of the first region 310, the second region 320, and the third region 330. For example, if the portable device 100 captures a first image in its front direction by using the first camera unit 120, the portable device 100 may display a first preview image corresponding to the first image on the second region 320. Also, for example, if the portable device 100 captures a second image in its rear direction by using the second camera unit 130, the portable device 100 may display a second preview image corresponding to the second image on the third region 330. Also, the portable device 100 may change the region where the preview image is displayed, without limitation to the aforementioned embodiment.

Figure 4A:
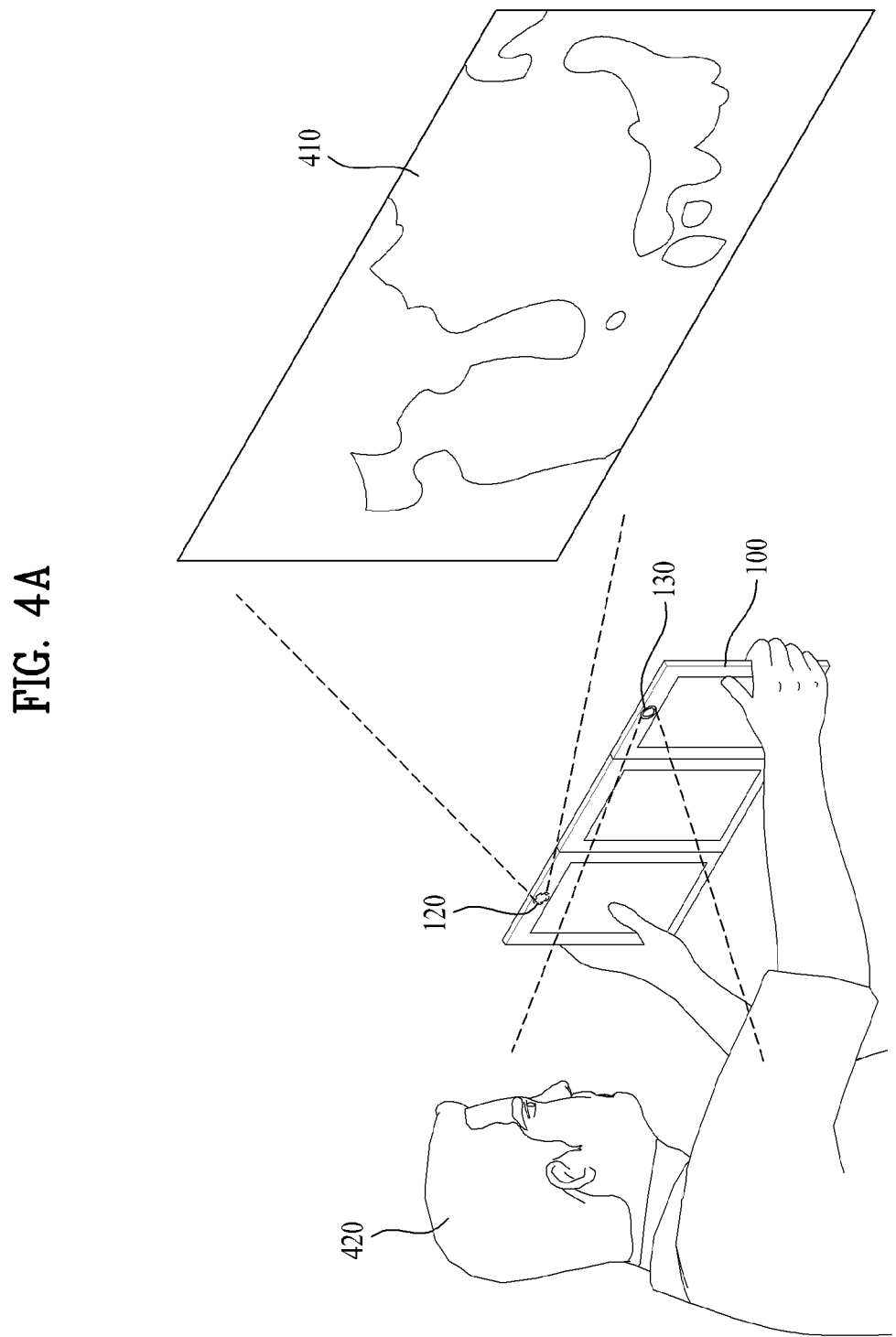
FIGS. 4a and 4b are diagrams illustrating a method for allowing a portable device to capture an image based on a first capturing mode in accordance with one embodiment of the present specification.
Figure 4B:
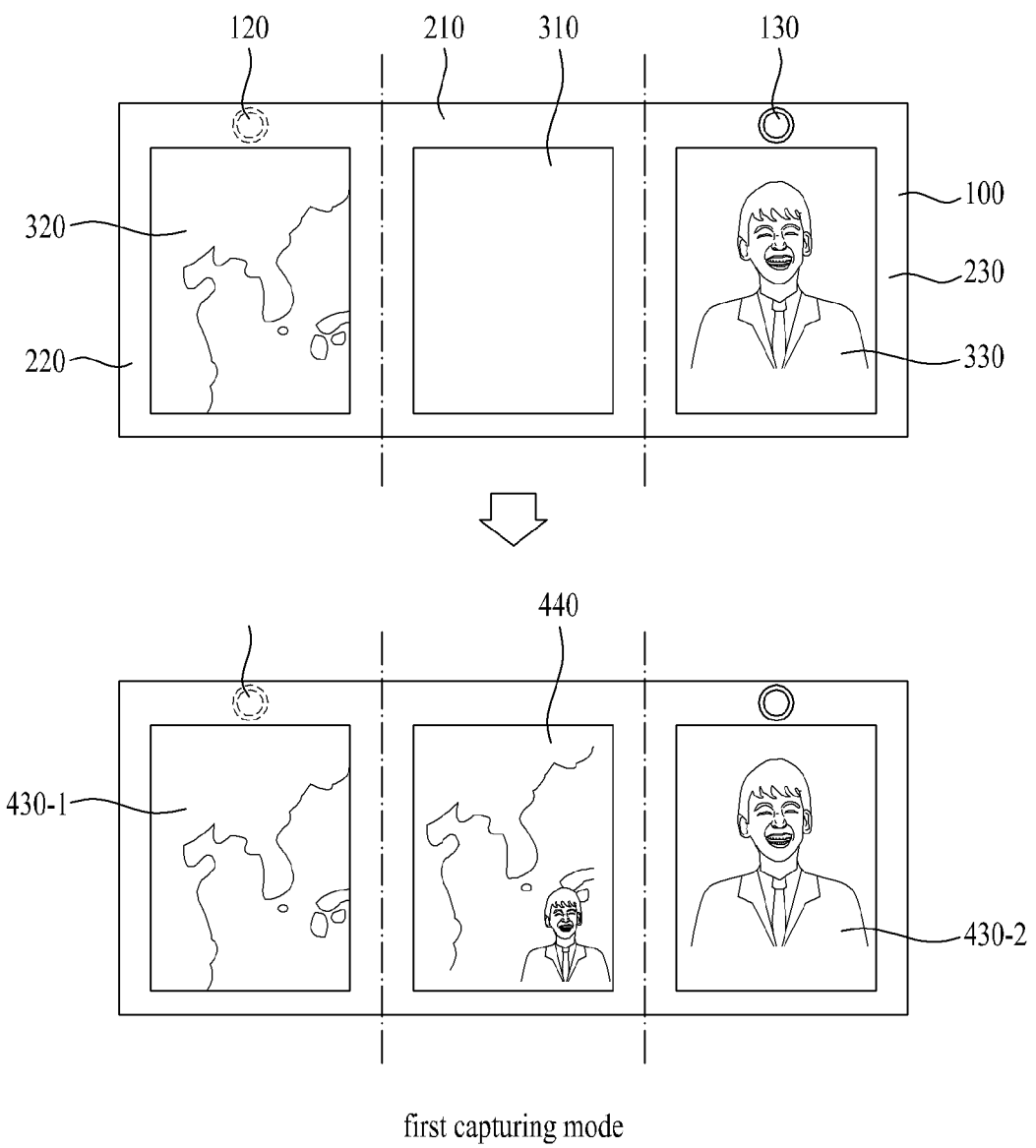

FIGS. 4a and 4b are diagrams illustrating a method for allowing a portable device to capture an image based on a first capturing mode in accordance with one embodiment of the present specification. For example, if the first capturing mode is set, the portable device 100 may take a peripheral image by using both the first camera unit 120 and the second camera unit 130. In more detail, referring to FIG. 4a, the portable device 100 may capture a first image 410 in its rear direction by using the first camera unit 120. Also, the portable device 100 may capture a second image 420 in its front direction by using the second camera unit 130.

At this time, for example, referring to FIG. 4b, the portable device 100 may display a first preview image 430-1 corresponding to the first image 410 on the second region 320. Also, the portable device 100 may display a second preview image 430-2 corresponding to the second image 420 on the third region 330. Also, for example, the portable device 100 may display a third preview image 440 on the first region 310. Also, the portable device 100 may store the third preview image 440 as a third image (not shown). At this time, the third preview image 440 may be the image generated by combining the first image 410 with the second image 420. In other words, the third preview image 440 may generate an image, which allows the user to be included on a weather map, by combining a "weather map" part of the first image 410 with a "user" part of the second image 420. As a result, the portable device 100 may store the image captured through the front direction and the image captured through the rear direction as one image, and is not limited to the aforementioned embodiment.

Figure 5B:
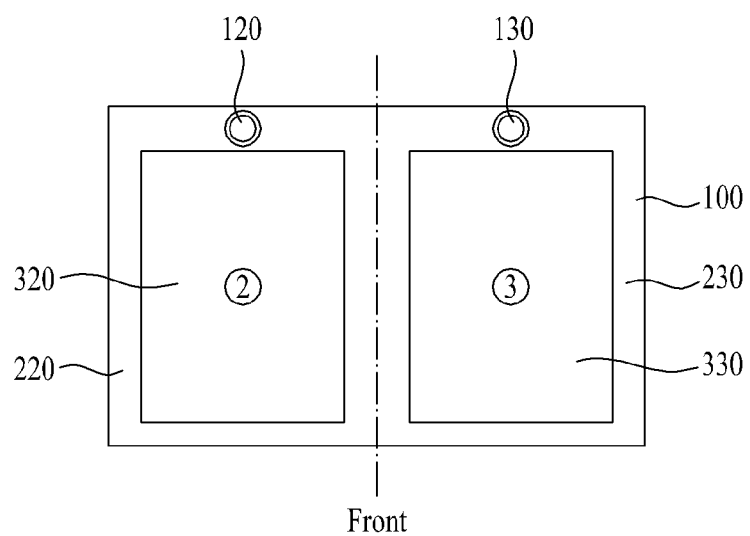
Figure 5B:
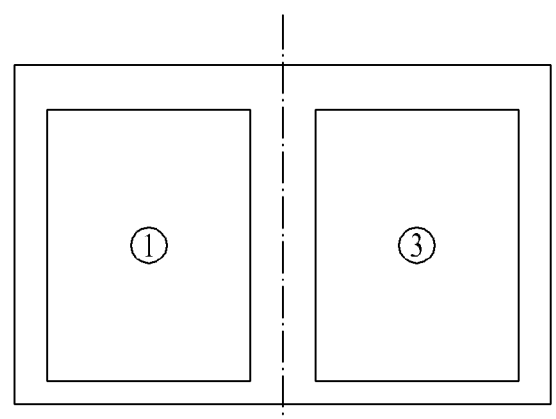

FIGS. 5a and 5b are diagrams illustrating a method for setting a portable device in a second capturing mode in accordance with one embodiment of the present specification.

If any one of the second body 220 and the third body 230 is folded to the first body 210, the portable device 100 may set the second capturing mode. At this time, for example, if the second capturing mode is set, the portable device 100 may capture a peripheral image by using both the first camera unit 120 and the second camera unit 130. Also, for example, if the second body 220 is folded to the first body 210 and the second capturing mode is set, the portable device 100 may capture the first image. Also, if the third body 230 is folded to the first body 210 and the second capturing mode is set, the portable device 100 may capture the second image. At this time, for example, the first image may be the image in the front direction of the portable device 100. Also, the second image may be the image in the rear direction of the portable device 100.

For example, referring to FIG. 5a, if the second body 220 is folded to the first body 210, the portable device 100 may set the second capturing mode. At this time, as described above, the second body 220 may be folded such that the front surface of the second body 220 may be overlapped with the front surface of the first body 210. Accordingly, if the second body 220 is folded, the rear direction of the second body 220 may be the same as the front direction of the first body 210. In other words, the second body 220 is overlapped with the front surface of the first body 210, and the rear direction of the second body 220 may be the front direction of the first body 210.

In more detail, referring to FIG. 5b, if the second body 220 is folded to the first body 210 and the second capturing mode is set, the second body 220 and the third body 230 may be located on the front surface of the portable device 100. At this time, for example, the first direction of the first camera unit 120 may be set equally to the second direction of the second camera unit 130. In other words, the first camera unit 120 and the second camera unit 130 may capture the image included in the front direction of the portable device 100. At this time, for example, the second region 320 of the second body 220 may be set in the front direction of the portable device 100. The portable device 100 may display the image on the second region 320. In more detail, the second region 320 may be set on the front region of the second body 220 before the second body 220 is folded. At this time, if the second body 220 is folded to the first body 210, the second region 320 may be set on the rear region of the second body 220.

Also, the first body 210 and the third body 230 may be included on the rear surface of the portable device 100.

Figure 6A:
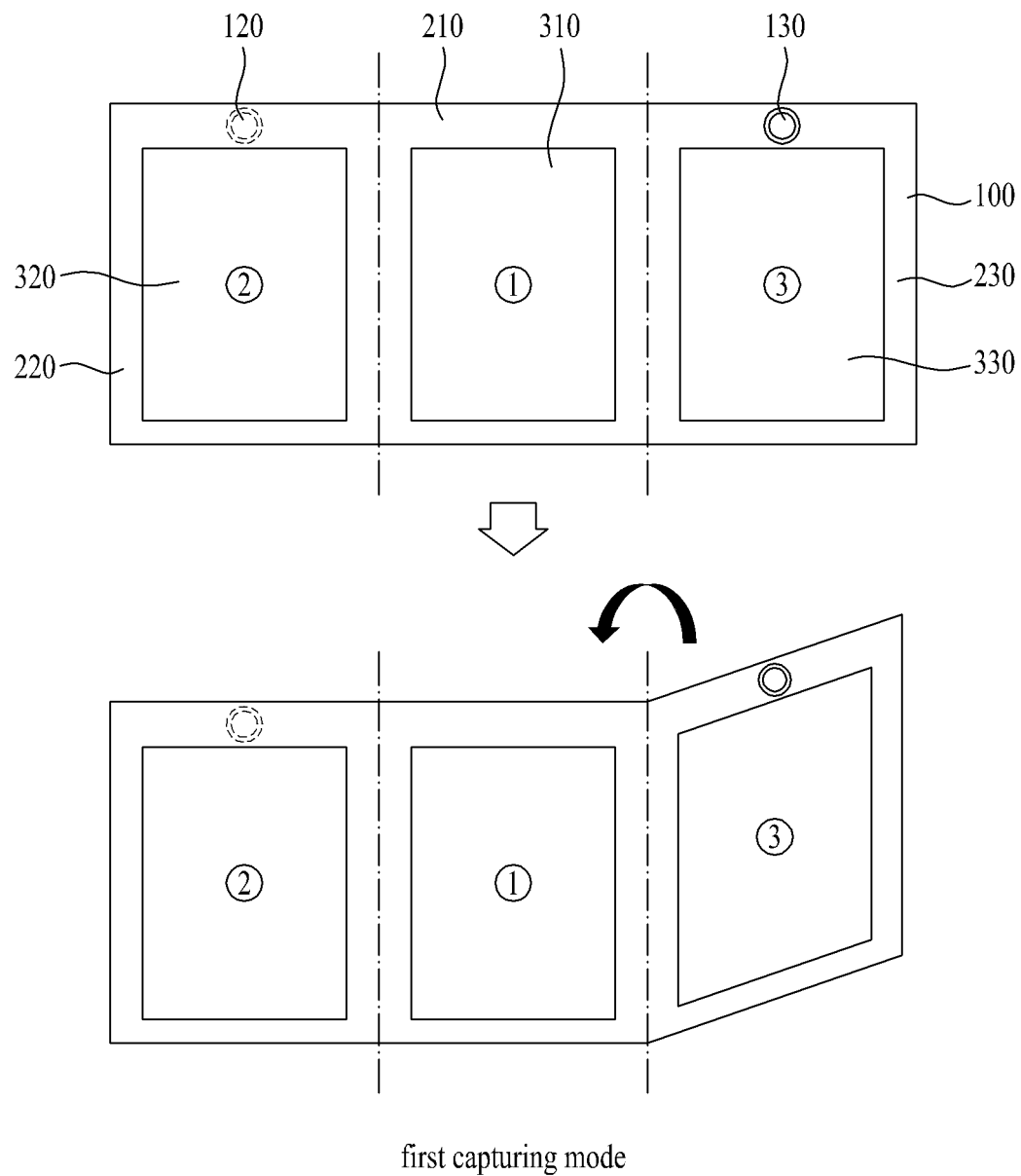
FIGS. 6a and 6b are diagrams illustrating a method for setting a portable device in a second capturing mode in accordance with one embodiment of the present specification.
Figure 6B:
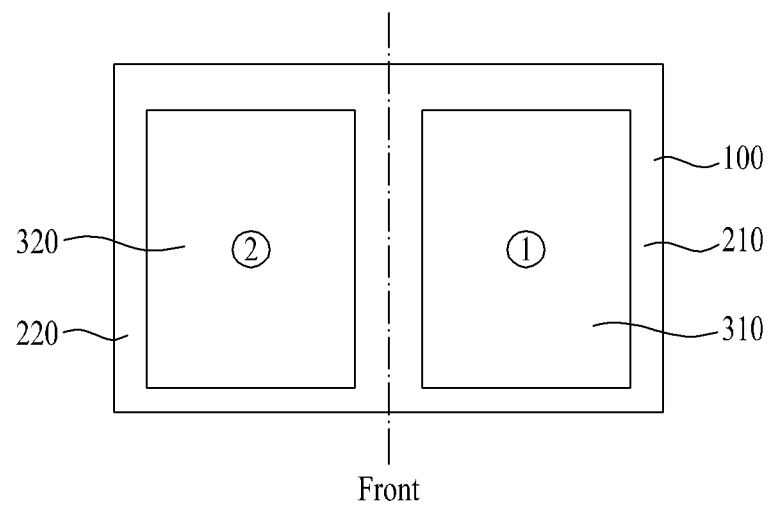
Figure 6B:
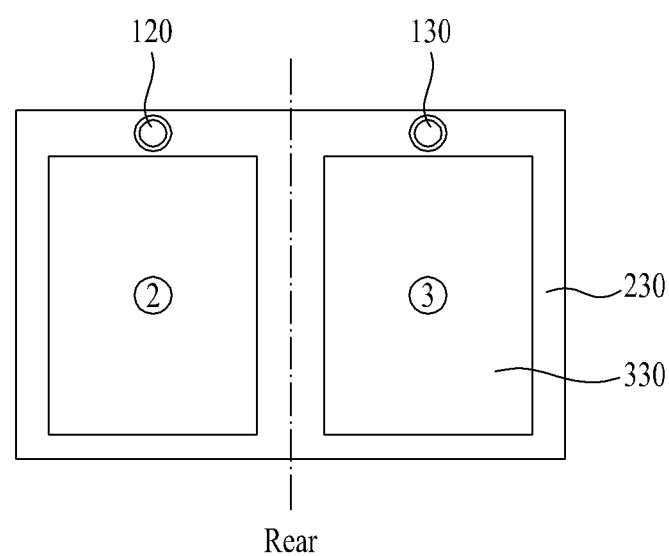

FIGS. 6a and 6b are diagrams illustrating a method for setting a portable device in a second capturing mode in accordance with one embodiment of the present specification.

Referring to FIG. 6a, if the third body 230 is folded to the first body 210, the portable device 100 may set the second capturing mode. At this time, as described above, the third body 230 may be folded such that the rear surface of the third body 220 may be overlapped with the rear surface of the first body 210. Accordingly, if the third body 230 is folded, the front direction of the third body 230 may be the same as the rear direction of the first body 210. In other words, the third body 230 is overlapped with the rear surface of the first body 210, and the front direction of the third body 230 may be the rear direction of the first body 210.

In more detail, referring to FIG. 6b, if the third body 230 is folded to the first body 210 and the second capturing mode is set, the second body 220 and the third body 230 may be located on the rear surface of the portable device 100. At this time, for example, the second direction of the second camera unit 130 may be set equally to the first direction of the first camera unit 120. In other words, the first camera unit 120 and the second camera unit 130 may capture the image included in the rear direction of the portable device 100. Also, the first body 210 and the second body 220 may be located on the front surface of the portable device 100.

Figure 7A:
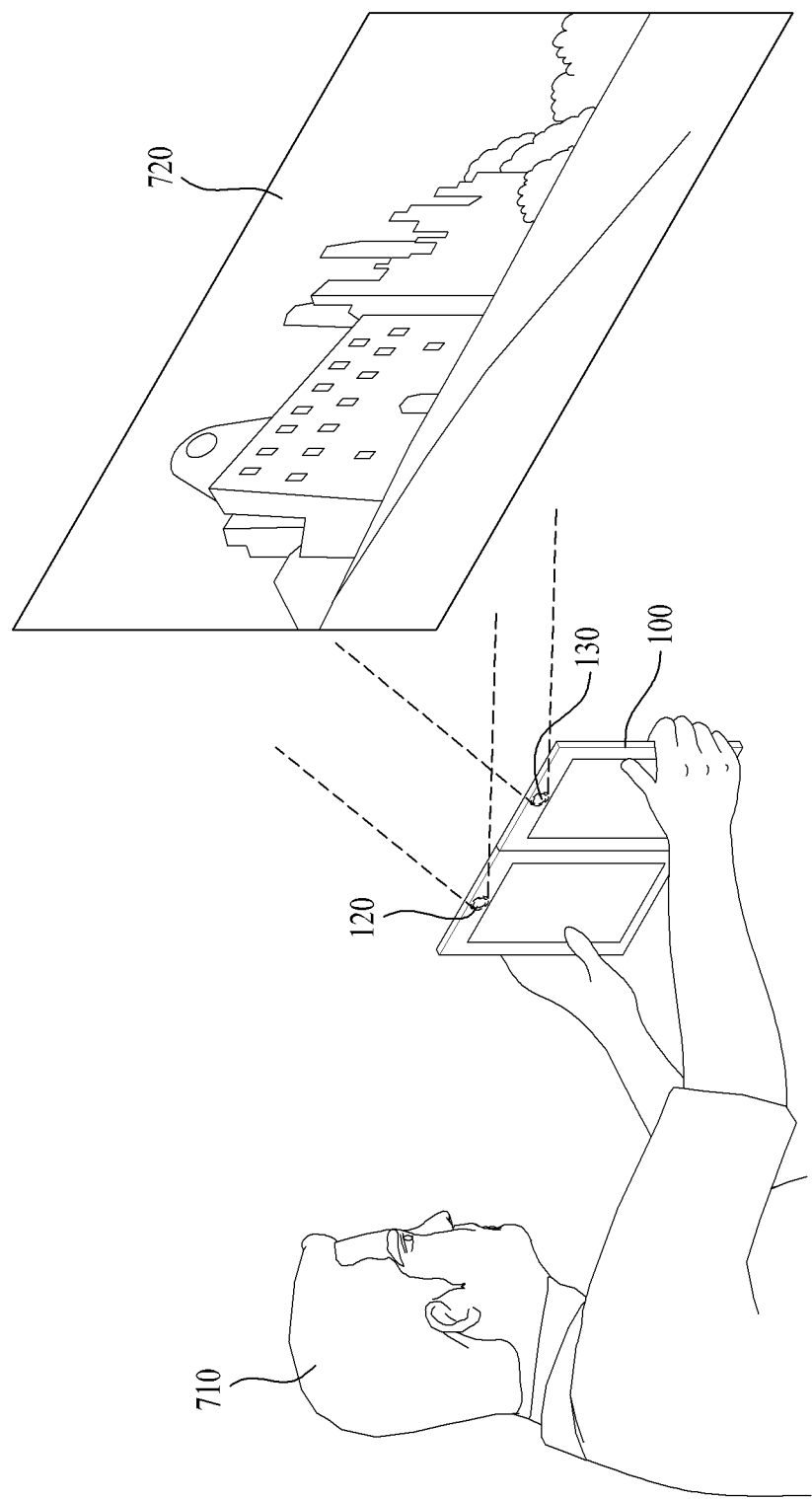
FIGS. 7a and 7b are diagrams illustrating a method for allowing a portable device to capture an image based on a second capturing mode in accordance with one embodiment of the present specification.
Figure 7B:
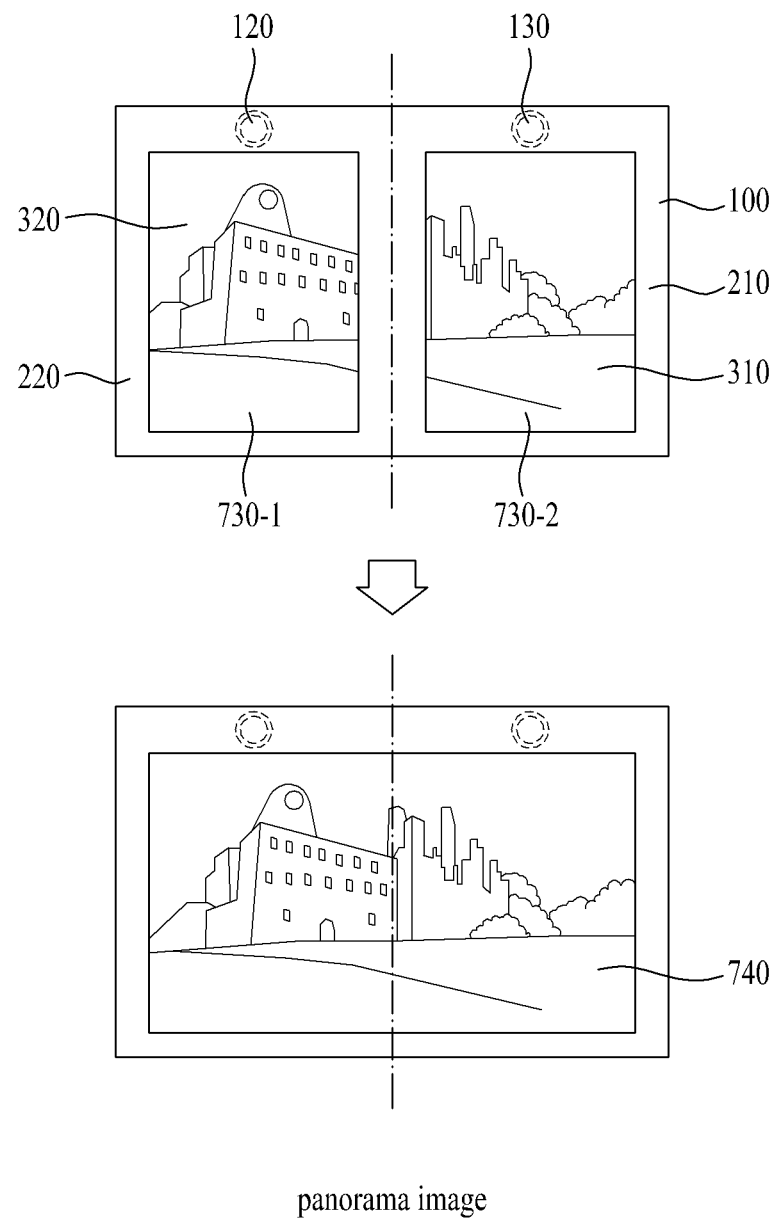

FIGS. 7a and 7b are diagrams illustrating a method for allowing a portable device to capture an image based on a second capturing mode in accordance with one embodiment of the present specification.

Referring to FIG. 7a, if the third body 230 is folded and the second capturing mode is set, the portable device 100 may capture the image in its front direction by using both the first camera unit 120 and the second camera unit 130. In more detail, the first camera unit 120 may capture the first image. Also, the second camera unit 130 may capture the second image. At this time, for example, the portable device 100 may display a first preview image 730-1 corresponding to the first image on the second region 320 of the second body 220. Also, the portable device 100 may display a second preview image 730-2 corresponding to the second image on the first region 310 of the first body 210 located behind the third body 230. As a result, the portable device 100 may provide the user with information on the image captured by the first camera unit 120 and the second camera unit 130. Also, for example, the first preview image 730-1 and the second preview image 730-2 may be displayed on any one of the first region 310 and the second region 320, and is not limited to the aforementioned embodiment. In other words, the portable device 100 may set the region where the preview image may be displayed, and is not limited to the aforementioned embodiment.

Also, the portable device 100 may generate a panorama image by using the first image and the second image. At this time, an overlap region of the first image and the second image may exist. In more detail, referring to FIG. 7b, the first image may be the same image as the first preview image 730-1. Also, the second image may be the same image as the second preview image 730-2. In other words, the first preview image 730-1 may be the region captured as the image by the first camera unit 120. Also, the second preview image 730-2 may be the region captured as the image by the second camera unit 130. At this time, an overlap region of the first preview image 730-1 and the second preview image 730-2 may exist. In more detail, the first camera unit 120 and the second camera unit 130 may have a certain view angle. At this time, the region included in the view angle of the first camera unit 120 may be included in the view angle of the second camera unit 130. Accordingly, the overlap region of the first image and the second image may exist. Also, the overlap region of the first preview image 730-1 and the second preview image 730-2 may exist. At this time, the portable device 100 may generate the panorama image by using the first image and the second image. Also, the portable device 100 may display a third preview image 740 corresponding to the panorama image on the first region 310 and the second region 320. At this time, the panorama image may be the image obtained by synthesizing a plurality of images based on the overlap region. In other words, the panorama image may be the image obtained by removing the overlap region and synthesizing a plurality of images as one image. As a result, the portable device 100 may generate the panorama image by using the plurality of camera units 120 and 130. Also, if the second body 220 is folded and the second capturing mode is set, the portable device 100 may capture the image in its rear direction by using both the first camera unit 120 and the second camera unit 130. At this time, the portable device 100 may generate the panorama image by using the image in the rear direction as described above.

Figure 8A:
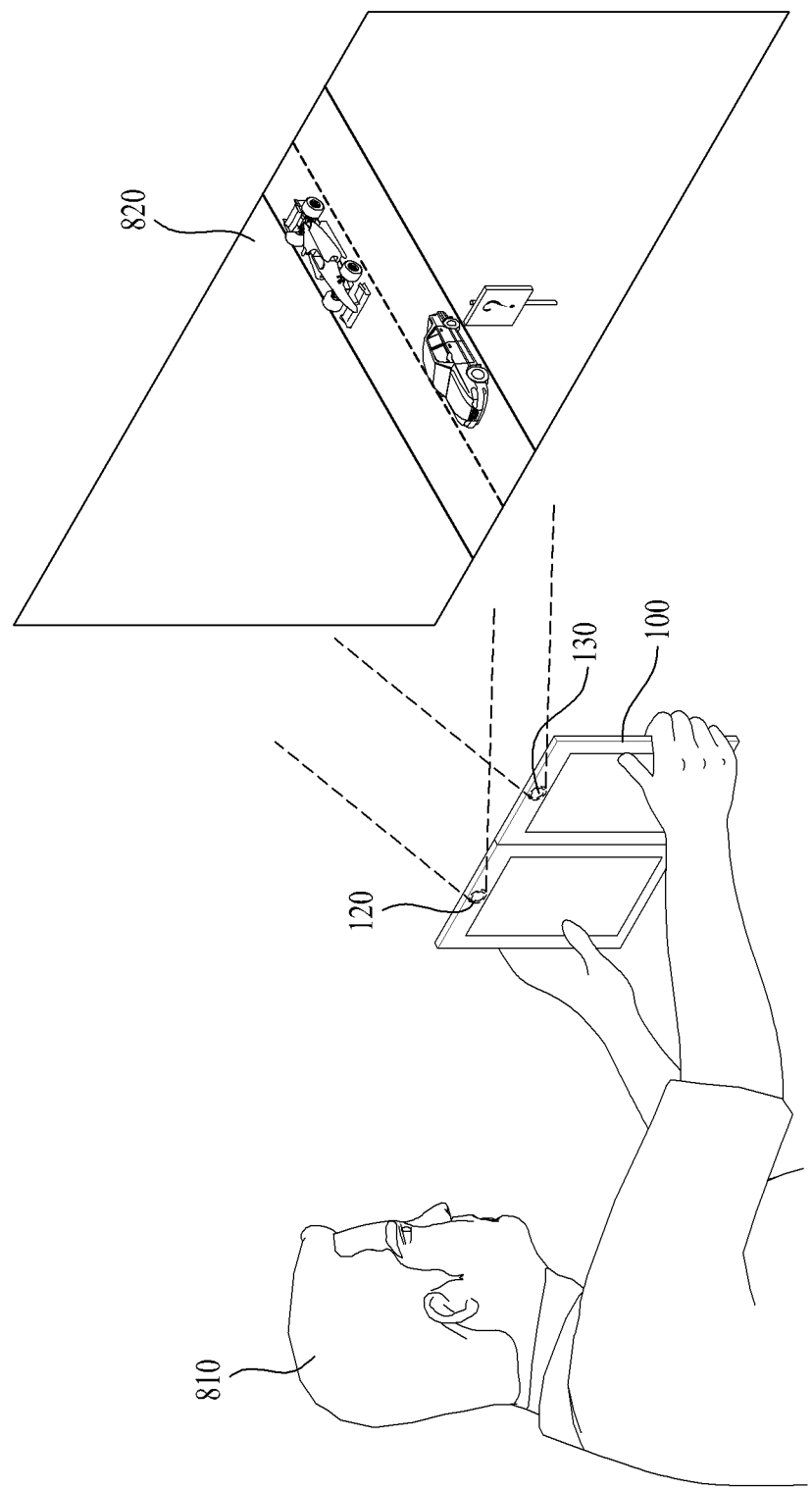
FIGS. 8a and 8b are diagrams illustrating a method for allowing a portable device to capture an image based on a second capturing mode in accordance with one embodiment of the present specification.
Figure 8B:
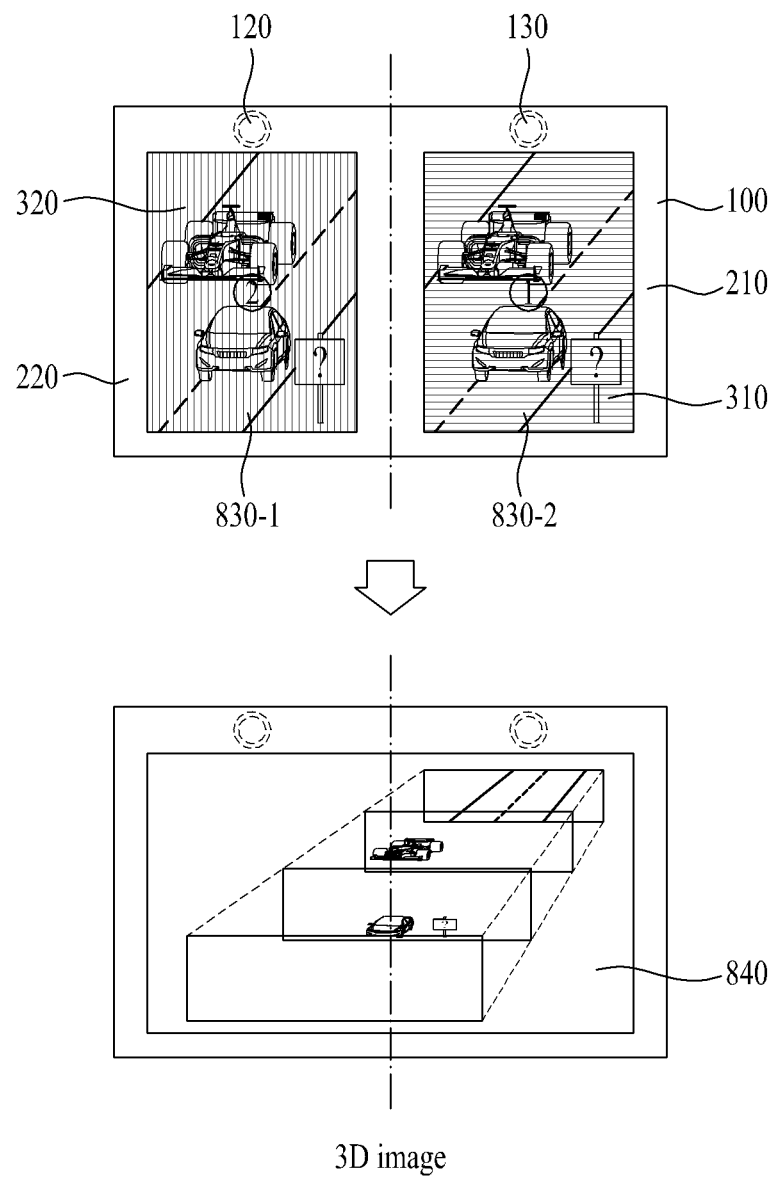

FIGS. 8a and 8b are diagrams illustrating a method for allowing a portable device to capture an image based on a second capturing mode in accordance with one embodiment of the present specification.

Referring to FIG. 8a, if the third body 230 is folded and the second capturing mode is set, the portable device 100 may capture the image in its front direction by using both the first camera unit 120 and the second camera unit 130. In more detail, the first camera unit 120 may capture the first image. Also, the second camera unit 130 may capture the second image. At this time, for example, the portable device 100 may display a first preview image 830-1 corresponding to the first image on the second region 320 of the second body 220. Also, the portable device 100 may display a second preview image 830-2 corresponding to the second image on the first region 310 of the first body 210 located behind the third body 230. As a result, the portable device 100 may provide the user with information on the image captured by the first camera unit 120 and the second camera unit 130. Also, for example, the first preview image 830-1 and the second preview image 830-2 may be displayed on any one of the first region 310 and the second region 320, and is not limited to the aforementioned embodiment. In other words, the portable device 100 may set the region where the preview image may be displayed, and is not limited to the aforementioned embodiment.

Also, the portable device 100 may generate a 3D image by using the first image and the second image. In more detail, referring to FIG. 8b, the portable device 100 may generate the 3D image by using binocular disparity of the first camera unit 120 and the second camera unit 130. At this time, the 3D image may mean the image captured to allow the user to recognize 3D stereoscopic effect/perspective. This portable device 100 may take the 3D image by using binocular disparity of the first camera unit 120 and the second camera unit 130. In more detail, the portable device 100 may use the plurality of camera units 120 and 130 in the same manner as that a person feels perspective through binocular disparity based on intervals (about 6.5 cm) between two eyes. At this time, the portable device 100 may stereoscopically capture the image through binocular disparity by generating an image corresponding to a left eye image visible to a left eye and a right eye image visible to a right eye. Also, for example, the portable device 100 may display a third preview image 840 corresponding to the 3D image on the first region 310 and the second region 320. At this time, for example, a mode for displaying a 3D image through the portable device 100 may be divided into a glasses mode and a glassesless mode. The glasses mode may include an anaglyphic 3D mode, a polarization 3D mode, an alternate-frame sequencing mode. The glassesless mode may include a disparity barrier mode, a lenticular lens mode, and a holographic mode. Through these modes, the portable device 100 may provide the user with the 3D image. Also, if the second body 220 is folded and the second capturing mode is set, the portable device 100 may capture the image in its rear direction by using both the first camera unit 120 and the second camera unit 130. At this time, the portable device 100 may generate the 3D image by using the image of the rear direction as described above.

Figure 9A:
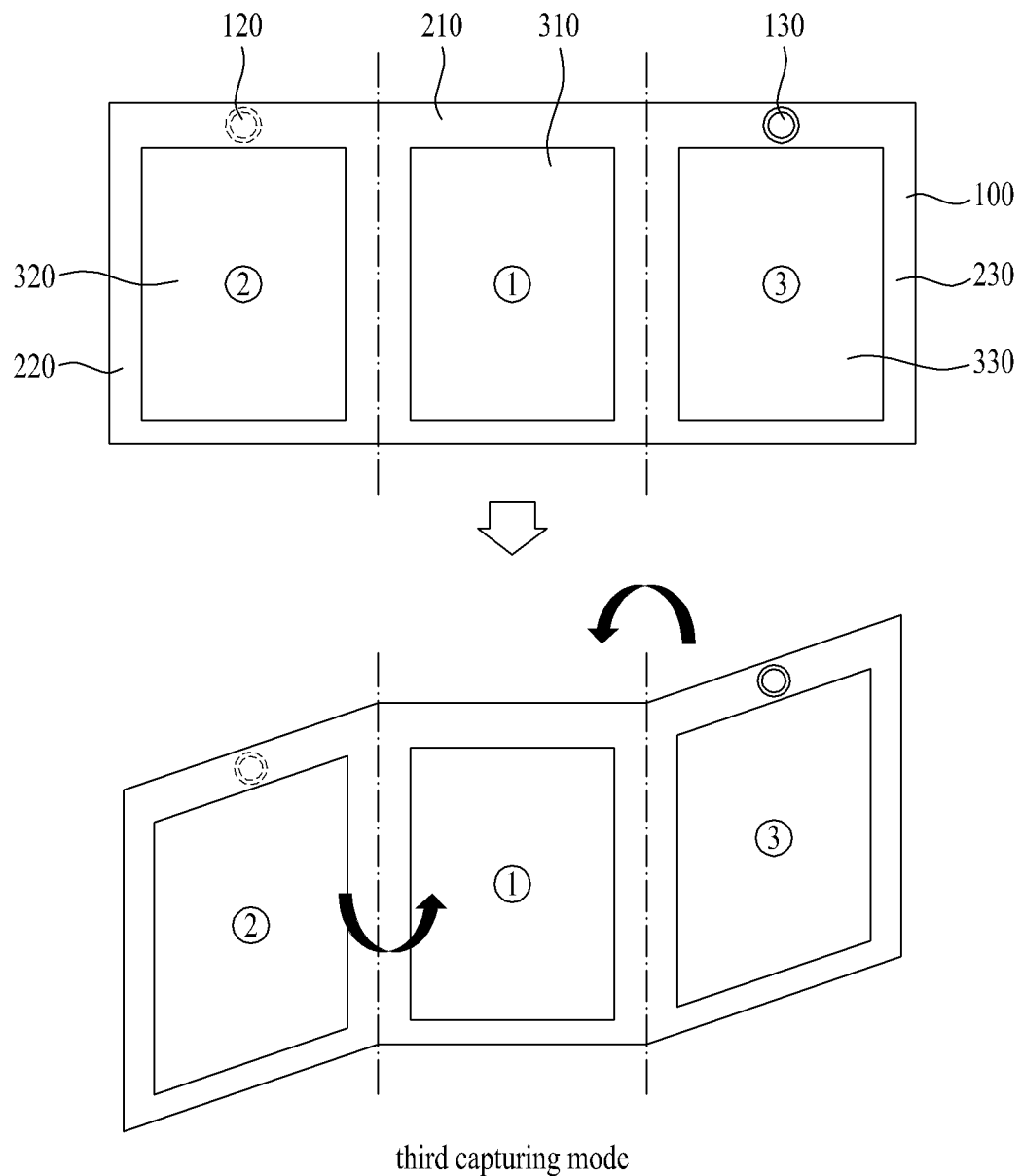
FIGS. 9a and 9b are diagrams illustrating a method for setting a portable device in a third capturing mode in accordance with one embodiment of the present specification.
Figure 9B:
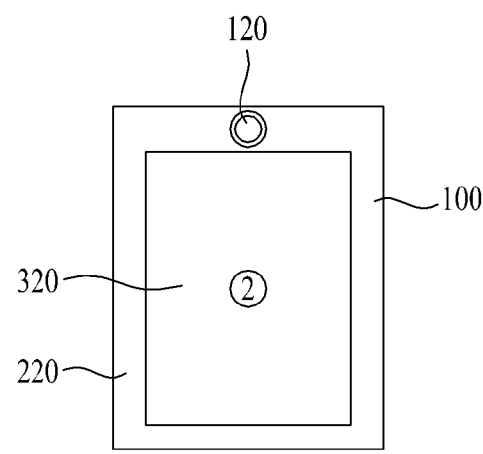
Figure 9B:
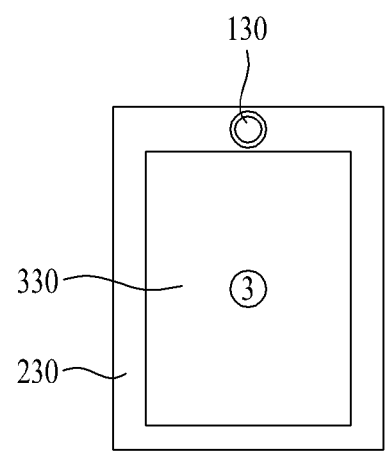

FIGS. 9a and 9b are diagrams illustrating a method for setting a portable device in a third capturing mode in accordance with one embodiment of the present specification.

If the second body 220 and the third body 230 are all folded to the first body 210, the portable device 100 may set the third capturing mode. At this time, referring to FIG. 9a, the second body 220 may be folded to be overlapped with the front surface of the first body 210. Also, the third body 230 may be folded to be overlapped with the rear surface of the first body 210. Accordingly, the second body 220 and the third body 230 may be simultaneously folded to the first body 210. At this time, for example, the portable device 100 may set the third capturing mode regardless of the folding order of the second body 220 and the third body 230. At this time, the portable device 100 may capture the image by using at least one of the first camera unit 120 and the second camera unit 130.

In more detail, referring to FIG. 9b, if the third capturing mode is set, the second body 220 may be located on the front surface of the portable device 100. At this time, the first camera unit 120 may capture the image in the front direction of the portable device 100. Also, if the third capturing mode is set, the third body 230 may be located on the rear surface of the portable device 100. At this time, the second camera unit 130 may capture the image in the rear direction of the portable device 100. As a result, the portable device 100 may capture the image in its front direction or rear direction. Also, the portable device 100 may display the preview image on the second region 320 of the second body 220 located in its front direction.

Figure 10A:
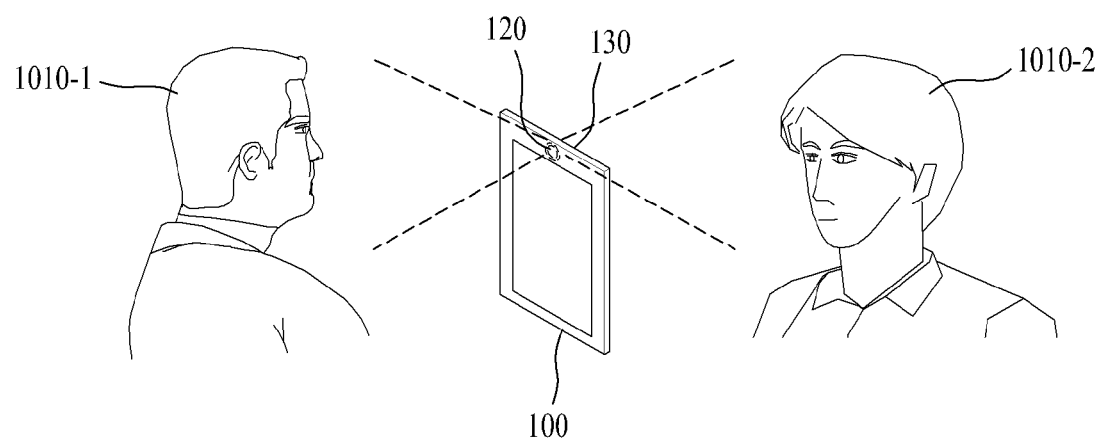
FIGS. 10a and 10b are diagrams illustrating a method for allowing a portable device to capture an image based on a third capturing mode in accordance with one embodiment of the present specification.
Figure 10B:
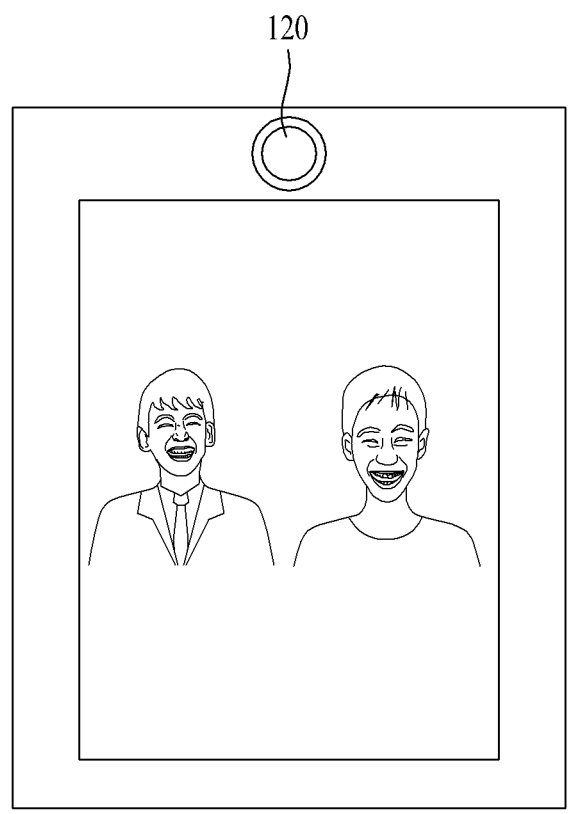

FIGS. 10a and 10b are diagrams illustrating a method for allowing a portable device to capture an image based on a third capturing mode in accordance with one embodiment of the present specification. If the third capturing mode is set, the portable device 100 may capture a first image 1010-1 by using the first camera unit 120. Also, the portable device 100 may capture a second image 1010-2 by using the second camera unit 130. At this time, for example, the portable device 100 may generate a third image 1020 by synthesizing the first image 1010-1 and the second image 1010-2. In other words, the portable device 100 may generate one image by combining the image captured in the front direction with the image captured in the rear direction. Also, for example, the portable device 100 may display the preview image corresponding to the third image 1020 on the second region, and is not limited to the aforementioned embodiment.

Figure 11:
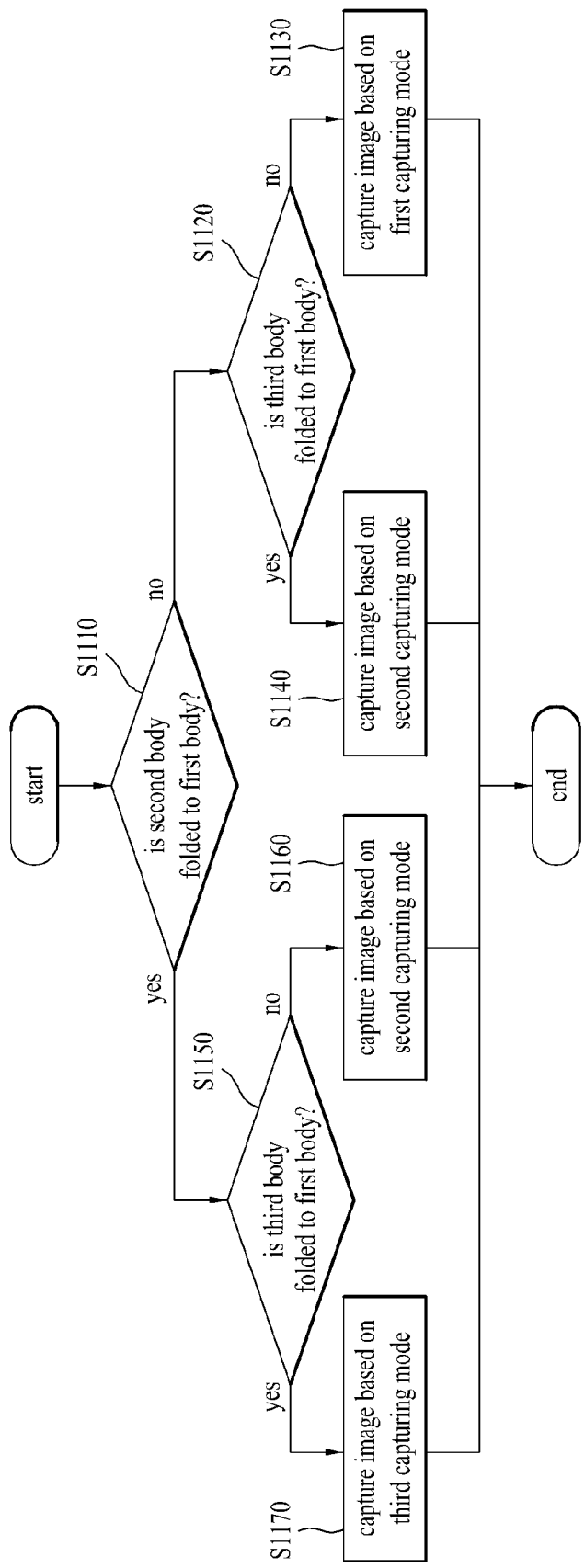
FIG. 11 is a diagram illustrating a method for controlling a portable device in accordance with one embodiment of the present specification.

FIG. 11 is a diagram illustrating a method for controlling a portable device in accordance with one embodiment of the present specification.

The portable device 100 may detect that the second body is folded to the first body (S1110). At this time, as described with reference to FIG. 1, the sensor unit 140 may detect the first folding angle of the second body and the first body. The sensor unit 140 may detect that the second body is folded to the first body if the first folding angle is less than the threshold angle. At this time, the threshold angle determines folding, and may have a certain error.

Next, if the second body is not folded to the first body, the portable device 100 may detect that the third body is folded to the first body (S1120). At this time, as described with reference to FIG. 1, the sensor unit 140 may detect the second folding angle of the third body and the first body. The sensor unit 140 may detect that the third body is folded to the first body if the second folding angle is less than the threshold angle. At this time, the threshold angle determines folding, and may have a certain error.

Next, if the third body is not folded to the first body, the portable device 100 may capture the image based on the first capturing mode (S1130). At this time, as described with reference to FIG. 3, the first capturing mode may be the state that the second body and the third body are all unfolded. At this time, the portable device 100 may capture the image by using at least one of the first camera unit 120 of the second body and the second camera unit 130 of the third body. For example, the first camera unit 120 may capture the image in the first direction, and the second camera unit 130 may capture the image in the second direction. At this time, if the first direction is the front direction of the second body, the second direction may be the rear direction of the third body. Also, if the first direction is the rear direction of the second body, the second direction may be the front direction of the third body as described above.

Next, if the third body is folded to the first body, the portable device 100 may capture the image based on the second capturing mode (S1140). At this time, as described with reference to FIGS. 6a and 6b, if the second capturing mode is set, the portable device 100 may capture the image in its rear direction. In more detail, the second direction of the second camera unit 130 of the third body may be set equally to the first direction of the first camera unit 120 of the second body. In other words, the first camera unit 120 and the second camera unit 130 may capture the image in the rear direction of the portable device 100. At this time, the portable device 100 may capture the image by using both the first camera unit 120 and the second camera unit 130. The portable device 100 may generate the panorama image or the 3D image by using the captured image.

Next, if the second body is folded to the first body, the portable device 100 may detect that the third body is folded to the first body (S1150). At this time, as described with reference to FIG. 1, the sensor unit 140 may detect the second folding angle of the third body and the first body. The sensor unit 140 may detect that the third body is folded to the first body if the second folding angle is less than the threshold angle. At this time, the threshold angle determines folding, and may have a certain error.

Next, if the third body is not folded to the first body, the portable device 100 may capture the image based on the second capturing mode (S1160). At this time, as described with reference to FIGS. 5a and 5b, if the second capturing mode is set, the portable device 100 may capture the image in its front direction. In more detail, the first direction of the first camera unit 120 of the second body may be set equally to the second direction of the second camera unit 130 of the third body. In other words, the first camera unit 120 and the second camera unit 130 may capture the image in the front direction of the portable device 100. At this time, the portable device 100 may capture the image by using both the first camera unit 120 and the second camera unit 130. The portable device 100 may generate the panorama image or the 3D image by using the captured image.

Next, if the third body is folded to the first body, the portable device 100 may capture the image based on the third capturing mode (S1170). At this time, as described with reference to FIGS. 9a and 9b, if the third capturing mode is set, the portable device 100 may capture the image by using the first camera unit 120 and the second camera unit 130. At this time, as described above, the portable device 100 may set the third capturing mode regardless of the folding order of the second body and the third body.

Although the description may be made for each of the drawings, the embodiments of the respective drawings may be incorporated to achieve a new embodiment. A computer readable recording medium where a program for implementing the embodiments is recorded may be designed in accordance with the need of the person skilled in the art within the scope of the present specification.

Also, the portable device and the method for controlling the same according to the present specification are not limited to the aforementioned embodiments, and all or some of the aforementioned embodiments may selectively be configured in combination so that various modifications may be made in the aforementioned embodiments.

In the meantime, the display device and the method for controlling the same according to the present specification may be implemented in a recording medium, which may be read by a processor provided in a network device, as a code that can be read by the processor. The recording medium that can be read by the processor includes all kinds of recording media in which data that can be read by the processor are stored. Examples of the recording medium include a ROM, a RAM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

In this specification, both the product invention and the method invention have been described, and description of both inventions may be made complementally if necessary.

What is claimed is:

1. A portable device comprising
a first body at a center of the portable device, a second body located at a left side of the first body, and a third body located at a right side of the first body:
a display unit configured to display an image on at least one of a first region of the first body, a second region of the second body and a third region of the third body;
a first camera unit configured to capture an image of a first direction,
wherein the first camera unit is included in the second body;
a second camera unit configured to capture an image of a second direction,
wherein the second camera unit is included in the third body;
a sensor unit configured to detect that the second body or the third body is folded to the first body; and
a processor configured to control the display unit, the first camera unit, the second camera unit and the sensor unit,
wherein the processor is further configured to:
capture the image based on a first capturing mode when the portable device is in an unfolded state,
capture the image based on a second capturing mode when the portable device is in a first folded state, and
capture the image based on a third capturing mode when the portable device is in a second folded state.

2. The portable device according to claim 1, wherein the first folded state is the state that any one of the second body and the third body is folded to the first body, and
the second folded state is the state that the second body and the third body are all folded to the first body.

3. The portable device according to claim 2, wherein the sensor unit is further configured to detect a first folding angle of the first body and the second body or a second folding angle of the first body and the third body,
wherein the first folding angle and the second folding angle have a maximum angle when it is in the unfolded state.

4. The portable device according to claim 3, wherein the processor is further configured to:

detect the second body and the third body in the unfolded state when the first folding angle and the second folding angle are more than or equal to a threshold angle, detect the second body in the folded state when the first folding angle is less than the threshold angle, and detect the third body in the folded state when the second folding angle is less than the threshold angle.

5. The portable device according to claim 1, wherein, if the first direction is a rear direction of the second body and the second direction is a front direction of the third body, the second body is folded to the first body resulting in a front surface of the second body to be overlapped with a front surface of the first body, and the third body is folded to the first body resulting in a rear surface of the third body to be overlapped with a rear surface of the first body.

6. The portable device according to claim 1, wherein, if the first direction is a front direction of the second body and the second direction is a rear direction of the third body, the second body is folded to the first body resulting in a rear surface of the second body to be overlapped with a rear surface of the first body, and the third body is folded to the first body resulting in a front surface of the third body to be overlapped with a front surface of the first body.

7. The portable device according to claim 1, wherein the processor is further configured to capture the image using at least one of the first camera unit and the second camera unit when the image is captured based on the first capturing mode.

8. The portable device according to claim 1, wherein the processor is further configured to display a preview image corresponding to the image on at least one of the first region, the second region and the third region.

9. The portable device according to claim 8, wherein the processor is further configured to:

if the image is captured by using both the first camera unit and the second camera unit in the first capturing mode, display a first preview image corresponding to a first image captured by the first camera unit on the second region, and display a second preview image corresponding to a second image captured by the second camera unit on the third region.

10. The portable device according to claim 9, wherein the processor is further configured to display a third preview image on the first region, wherein the third preview image is the preview image generated by combining the first image and the second image.

11. The portable device according to claim 1, wherein the processor is further configured to capture the image by using both the first camera unit and the second camera unit when the image is captured by the second capturing mode.

12. The portable device according to claim 11, wherein the first camera unit captures the first image, the second camera unit captures the second image, and the processor is further configured to generate a panorama image by using the first image and the second image.

13. The portable device according to claim 11, wherein the first camera unit captures the first image, the second camera unit captures the second image, and the processor is further configured to generate a three-dimensional (3D) image by combining the first image with the second image based on binocular disparity of the first camera unit and the second camera unit.

14. The portable device according to claim 10, wherein, if the third body is folded to the first body and the second capturing mode is set, the second direction is set equally to the first direction, and the first image of the first direction is captured by using the first camera unit included in the second body and the second camera unit included in the third body.

15. The portable device according to claim 14, wherein the processor is further configured to display a preview image corresponding to the first image on at least one of the first region and the second region.

16. The portable device according to claim 14, wherein, if the second body is folded to the first body and the second capturing mode is set, the first direction is set equally to the second direction, and the second image of the second direction is captured by using the first camera unit located in the second body and the second camera unit located in the third body.

17. The portable device according to claim 1, wherein the processor is further configured to capture the image by using at least one of the first camera unit and the second camera unit when the image is captured based on the third capturing mode.

18. The portable device according to claim 17, wherein the first camera unit captures the first image in a front direction of the portable device, the second camera unit captures the second image in a rear direction of the portable device, and wherein the processor is further configured to generate a third image by combining the first image and the second image.

19. The portable device according to claim 1, wherein the portable device is a flexible display device, and the first body, the second body and the third body are identified from one another based on folding of the flexible display device.

20. A method for controlling a portable device including a first body at a center of the portable device, a second body located at a left side of the first body, and a third body located at a right side of the first body, the method comprising, detecting that the second body or the third body is folded to the first body, by using a sensor unit; and capturing an image by at least one of a first camera unit located in the second body and a second camera unit located in the third body, wherein the first camera unit captures an image of a first direction, and the second camera unit captures an image of a second direction, the image is captured based on a first capturing mode if the portable device is in an unfolded state, the image is captured based on a second capturing mode if the portable device is in a first folded state, and the image is captured based on a third capturing mode if the portable device is in a second folded state.

* * * * *